Jan. 1, 1957    L. T. ELLIOTT ET AL    2,775,908
DRIVE SOURCE SHIFTING DEVICE FOR VALVE CONTROL OR THE LIKE
Filed Sept. 19, 1952    5 Sheets-Sheet 1

Lynn T. Elliott
James N. Morrell
INVENTORS

BY Wm. E. Ford

ATTORNEY

Jan. 1, 1957 L. T. ELLIOTT ET AL 2,775,908
DRIVE SOURCE SHIFTING DEVICE FOR VALVE CONTROL OR THE LIKE
Filed Sept. 19, 1952 5 Sheets-Sheet 4

INVENTORS
Lynn T. Elliott &
James N. Morrell

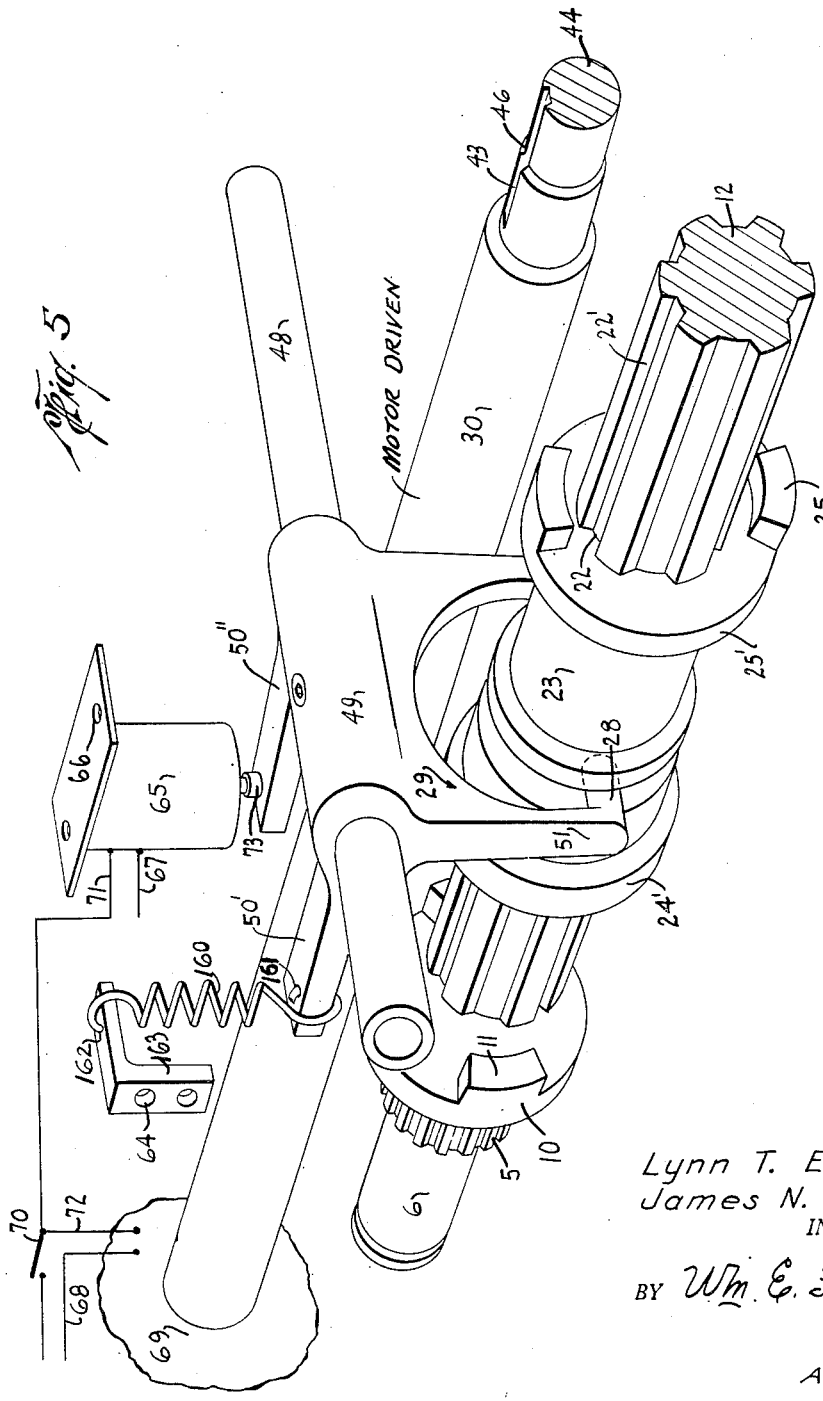

United States Patent Office 2,775,908
Patented Jan. 1, 1957

2,775,908

DRIVE SOURCE SHIFTING DEVICE FOR VALVE CONTROL OR THE LIKE

Lynn T. Elliott and James N. Morrell, Houston, Tex.

Application September 19, 1952, Serial No. 310,528

28 Claims. (Cl. 74—625)

This invention relates to a drive source shifting device which is adapted to shift from one driving source, as a manually operated source, to another source, as a power drive source.

It is an object of this invention to provide a drive source shifting device which is adapted to safely shift from a manually operated drive to power driven drive with no attendant hazards as a result of such shift.

It is also an object of this invention to provide a lost motion connection between either the manually operated or the power driven drive and the clutch on the shaft or means to be driven whereby the impact of the driving force may be directly imparted to the driven shaft.

It is also an object of this invention to provide a driving source shifting device of this class in which a friction member on the drive shaft of the manually operated means completes the clutch shifting connection with the clutch shifter.

It is yet another object of this invention to provide a drive source shifting device of this class in which a resilient means connects the frame of the device to the clutch shifter thereof to normally urge said clutch shifter to hold the clutch in manually operating position until such urging is overcome by the force of a solenoid or a governor taking effect upon the starting of the power driven means.

It is also an object of this invention to provide a drive source shifting device which may be simply constructed as, for example, a valve control unit or the like with a minimum of parts insuring effective and positive operation Other and further objects will be apparent when the specification is considered in connection with the drawings in which:

Fig. 5 is a perspective view showing still another modification of the invention.

Figure 1:
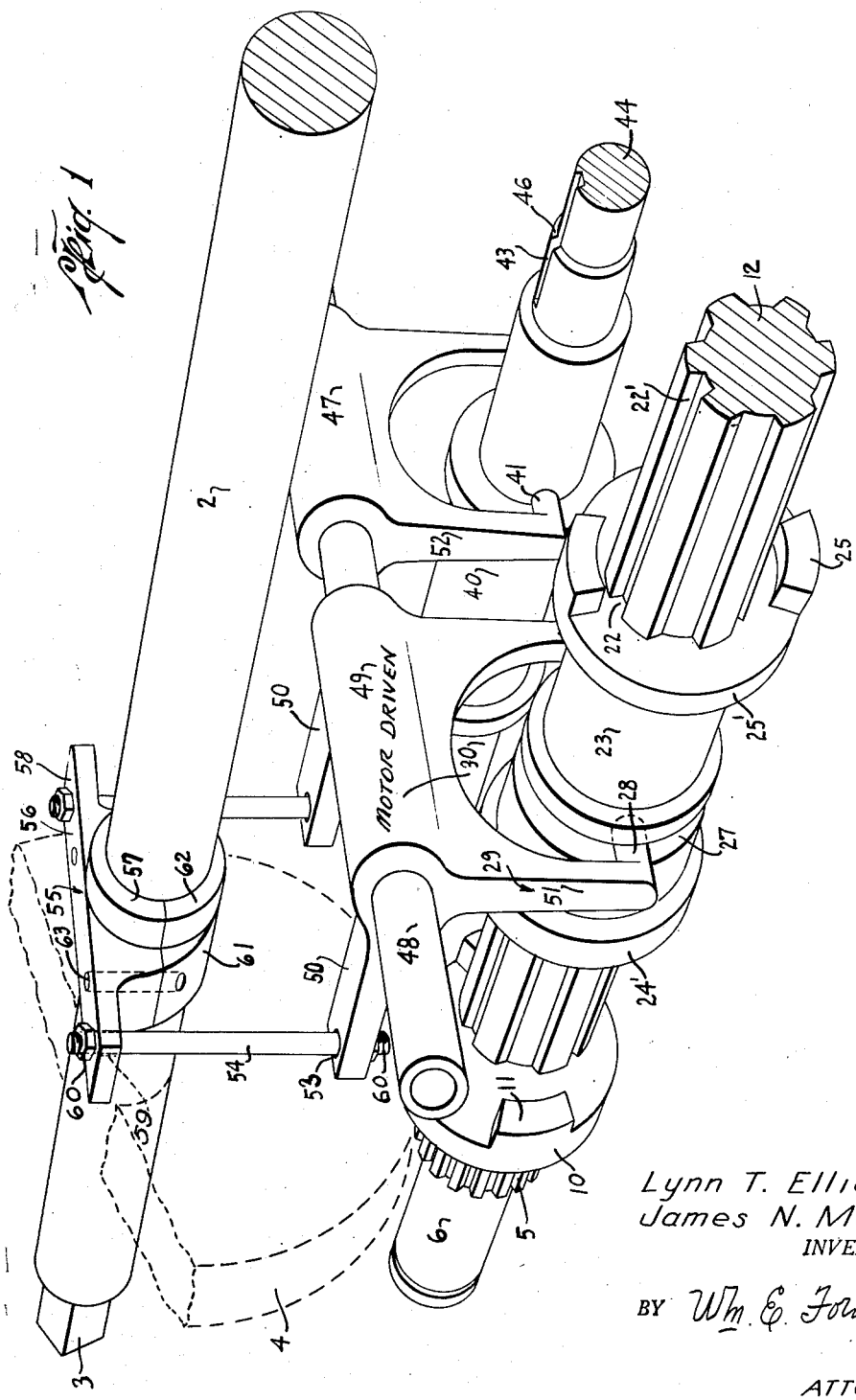
Fig. 1 is a perspective view showing one modification of the invention.
Figure 2:
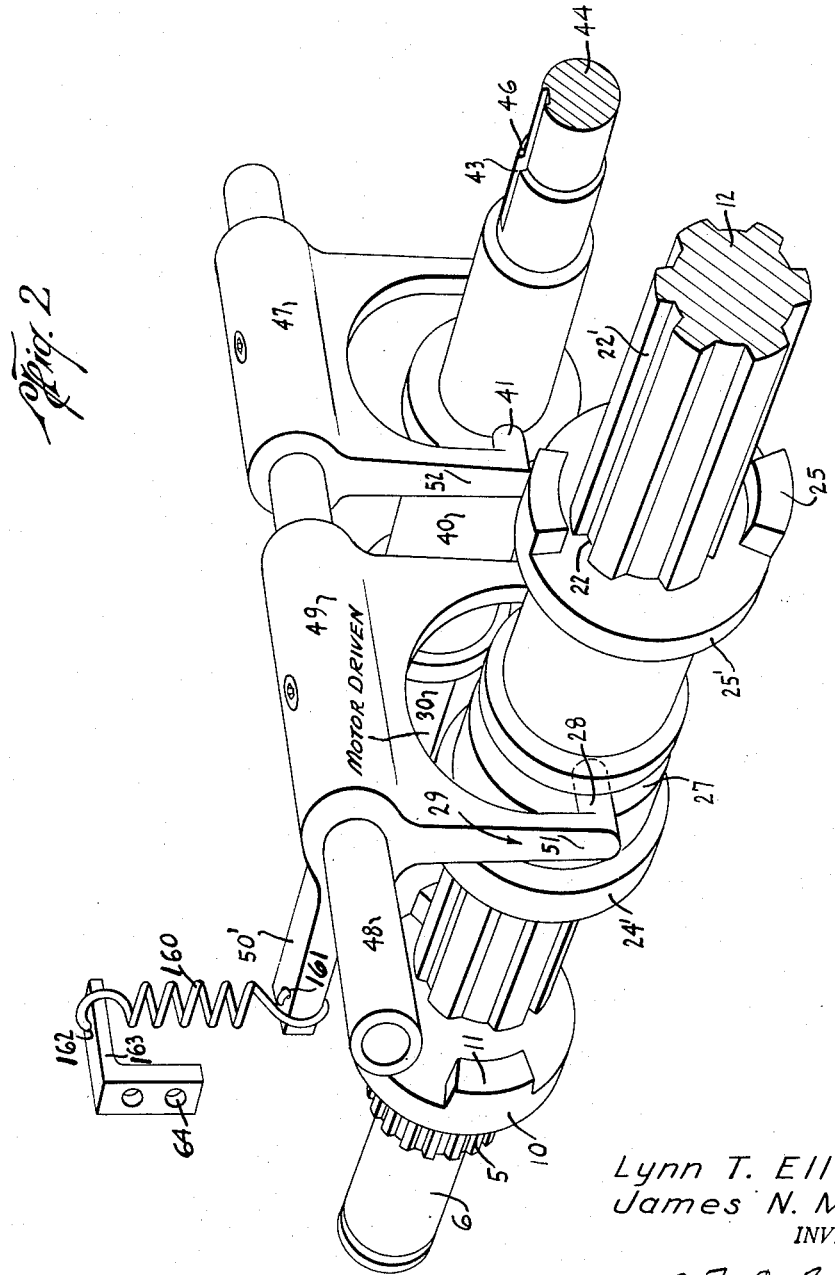
Fig. 2 is a perspective view showing another modification of the invention.
Figure 3:
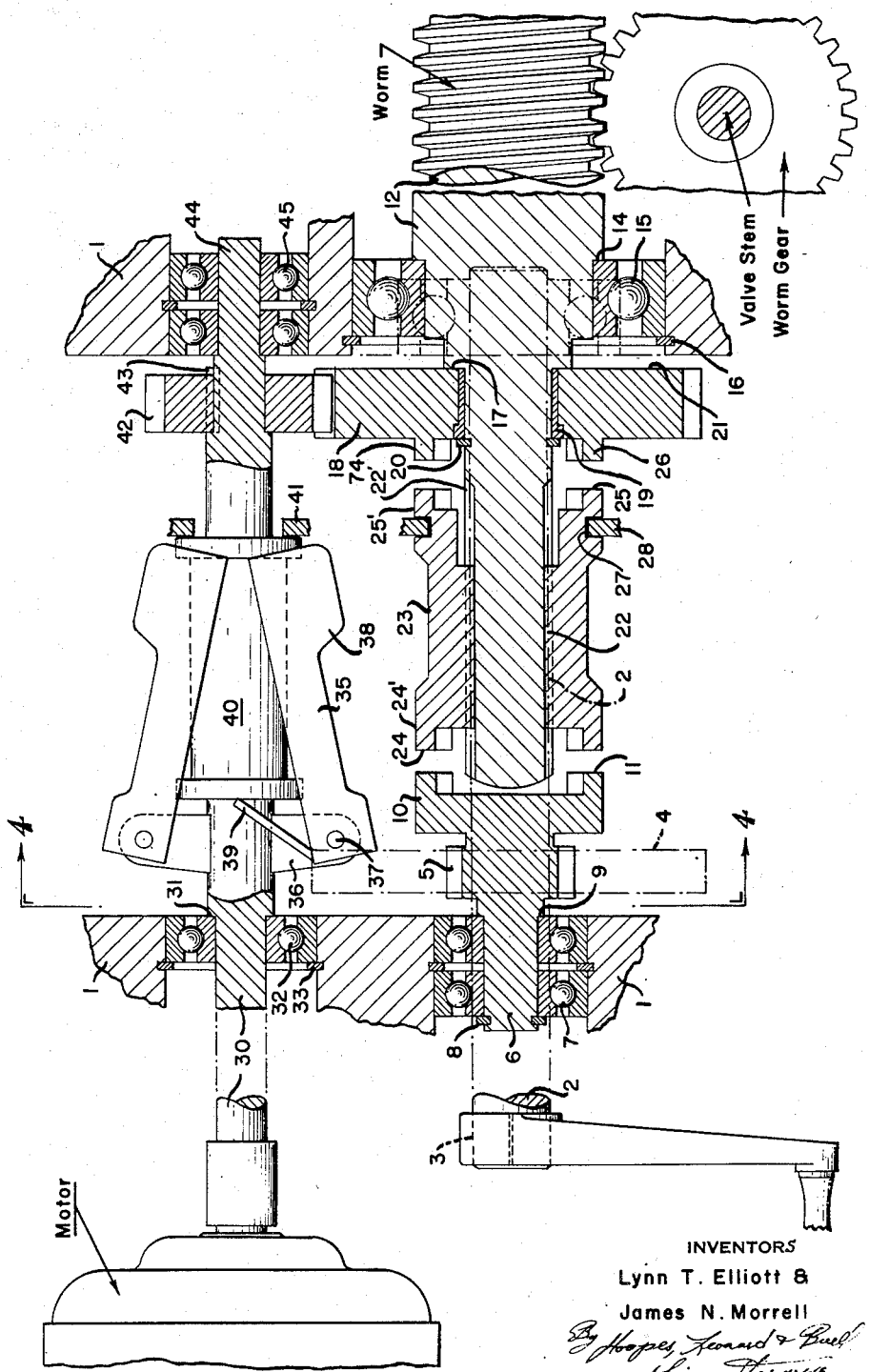
Fig. 3 is a plan view applicable to either the modification of the Fig. 1 or the modification of Fig. 2, showing the arrangement of the shaft immediately driven by the power means and of the driven shaft and which view includes the means associated with such driven shaft for connecting it to be driven by either the power means or the manually operated means.
Figure 4:
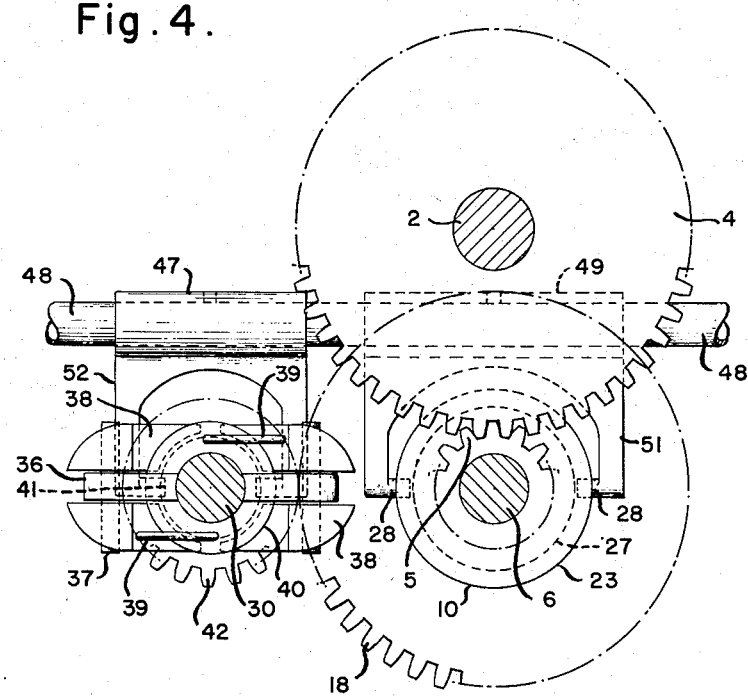
Fig. 4 is an elevation taken along line 4—4 of Fig. 3.

Considering Fig. 1 in connection with Figs. 3 and 4, the manually driven shaft 2 is journalled at either end in the frame 1 which is shown in Fig. 3, but not in Fig. 1 or 2. Outwardly of the frame 1 the shaft 2 has a portion of non-circular cross-section as the square cross-section portion 3 on which a crank or lever shown in Fig. 3 may be installed. The gear 4, indicated in Fig. 1 in dotted lines in order not to obscure the figure, and also shown in Fig. 4, is mounted on the shaft 2 inwardly of the frame 1 to mesh with the pinion 5 on the stub shaft 6, which is journalled in the bearing 7 in the frame 1; the keeper 8 and the shoulder 9 holding the stub shaft 6 against axial movement. The clutch portion 10 is integrally connected with the pinion 5 and has the jaws 11 thereon.

The driven shaft 12 shoulders at 14 against the bearings 15 in frame 1 and the keeper 16 locks the bearings 15 against axial movement. This driven shaft 12 also has the shoulder 17 thereon and the spur gear 18 is mounted on the bushing 19 surrounding the driven shaft 12. The keeper 20 confines the gear 18 against axial movement as the face 21 thereof is opposed by the shoulder surface 17. Inwardly of the gear 18 the shaft 12 has the spline grooves 22' therein to receive the splines 22 of the clutch 23. This clutch 23 has the jaws 24 on its end 24' and the jaws 25 on its end 25' at either end thereof so that there is a lost motion between the jaws 24 on the clutch 23 and the jaws 11 on the clutch section 10. Also the jaws 25 of the clutch 23 and the jaws 26 on the gear 18 are so constructed as to permit lost motion therebetween. Additionally the clutch 23 has the annular groove 27 therein to receive the clutch shifter prongs 28 on the clutch shifter 29, to be hereinbelow described.

A motor shown in Fig. 3 directly drives the shaft 30 which shoulders at 31 against the bearing 32 in the frame 1, whereas the keeper 33 maintains the bearing 32 locked against axial movement.

The governor 35 comprises the ears 36 connected to the shaft 30 and the centrifugal force actuated members 38, which are pivoted at 37 on such ears to move outwardly when the shaft 30 is driven. Each arm 39 is rigidly connected to pivot pin 37 which is rotatably journalled in an ear 36, and also a centrifugally operated element 38 is rigidly connected to such pin 37, so that these elements move outwardly due to the speed of the shaft 30, causing the arms 39 to bear against the sleeve 40 which is slidable on the shaft 30 to force the sleeve 40 to the right and to thereby exert force upon the prongs 41 of the clutch shifter 29.

The pinion 42 is keyed at 43 to the shaft 30 on the opposite side of the sleeve 40 from the governor 35 and the end 44 of the shaft 30 is journalled in the bearings 45 in the frame 1 while the shaft shoulders at 46 against such bearings.

The clutch shifter 29 comprises the shifting section 47, which is rigidly connected to the shaft 48 extending transversely of the shafts 30, 12 and 2. Such shaft 48 also has rigidly fixed thereto the shifting section 49.

The shifting section 49 has the arms 50 extending therefrom at substantially right angles to the arms 51 of such section which provide the prongs 28, while the shifting section 47 has the arms 52 extending parallel to the arms 51 to provide the prongs 41.

The arms 50 have the holes 53 in the outer ends thereof through which extend the connecting studs 54 to connect the clutch shifter 29 and the friction element 55. Such friction element 55 has an upper section 56 having a bearing portion 57 of semi-circular cross section to fit the upper surface of the shaft 2, and the arms 58 extending outwardly therefrom to provide the holes 59 to receive therethrough the upper ends of the studs 54. The stud ends are threaded and the nuts 60 on such ends adjustably complete the connection between clutch shifter and friction element. The friction element 55 is completed by the lower section 61 which has a bearing portion 62 of semi-circular cross-section to fit the lower surface of the shaft 2.

The pins 63 threadably and adjustably connect the two sections of the friction element 55, the tolerance of the connection being such that rotation of the shaft 2 is sufficient to initially rotate the friction element 55 in the direction of rotation of the shaft 2.

Thus it can be seen that clockwise rotation of the shaft 2, as viewed in Fig. 1, will cause the friction element 55 to rotate likewise in a clockwise direction with the result that the nut 60 on the left stud 54 pulls upwardly on the arm 50' to cause the arm 51 to move rearwardly to thereby engage the clutch end 24' with the clutch portion 10, after which rotation of the gear 4 with the shaft 2 will take up the lost motion between the jaws 11 and the jaws 24 to bring the jaws 11 into jarring impact with the jaws 24. Then, since the clutch 23 is splined to the driven shaft 12, this jarring impact is transmitted on through the shaft 12 to any elements which may be in the line of transmission therefrom.

In the modification shown in Fig. 2, for which the plan view of Fig. 3 and the elevation of Fig. 4 are also completely applicable, the shaft 2 is not shown in order not to obscure the figure, and such shaft has the friction element 55 of Fig. 1 completely eliminated. Also, the clutch shifter section 49 has a single arm 50' and one end of the spring 160 is connected to the outer end of such arms at 161, with the other end of the spring being connected at 162 to the bracket 163 which is rigidly mounted at 64 to the frame 1, not shown in Fig. 2, in order to lend clarity.

Thus, when the governor 35 shown in Fig. 3 is inoperative to overcome the force of the spring 160, the spring will pull the arm 50' upwardly, thereby causing the arm 51 to rotate to force the clutch 23 to the left to engage the jaws 24 and 11. Thus it can be seen that, when the motor, not shown, which drives the shaft 30, is inoperative to cause the governor 35 to oppose the force of the spring 160, the manually operated drive of the device is in effect as its normally operative condition.

In the modification shown in Fig. 5, the governor 35 is eliminated from the shaft 30, and the clutch shifting section 47 is eliminated from the shaft 48, while the solenoid 65 is mounted at 66 to the frame 1, not shown in this figure. The lead 67 from the solenoid and the lead 68 from the motor 69 are connected to the positive side of a source of electric power, while the lead 71 from the solenoid and the lead 72 from the motor are connected to the pivoted end of the switch 70. Thus when the switch is closed to complete the circuit through the negative side of the line to the source of electric power, the solenoid is actuated as the motor starts, and its plunger 73 forces downwardly on the arm 50" to rotate the arms 51 to move the clutch 23 to the right to engage the clutch end 25' with the clutch portion 74 of the gear 18.

Thus, as in the case of the modifications shown in Figs. 1 and 2, the power drive is effected through the shaft 30, pinion 42, gear 18, clutch 23, and shaft 12, and in such case the lost motion between the jaws 26 and jaws 25 is taken up by the impact of the jaws 26 against the jaws 25 being imparted directly to the shaft 12, the elements in the line of transmission driven thereby.

This invention has a multiplicity of usages and one specific usage consists of its employment as a valve operator or valve control of the non-coincidental class shown in R. C. Ball Patent No. 2,114,013. However, this invention differs from the invention of such prior art patent in the operating and clutch shifting structure and in that the impact of both the manually operated drive and the power drive is imparted to the element corresponding to the worm drive in such prior art patent, thereby avoiding imparting the lost motion takeup impact to any element installed on the axis of the valve.

Additionally this invention departs from the prior art in providing shift means which is instantaneously and positively operated through a minimum number of parts to shift from one drive source to the other.

Broadly this invention comprehends a drive source shifting device adapted to positively shift from one driving source, as a manually operated transmission, to another driving source, as a power drive transmission, in which such shift is positively made through a minimum number of elements.

What is claimed is:

1. A device for transmitting a power driven or a manually applied force alternately and comprising, a driven shaft, a manually operated means adapted for selective driving connection with said driven shaft, a power driven mechanism adapted for selective driving connection with said driven shaft, a clutch which is alternately operable to connect either said power driven mechanism or said manually operated means with said driven shaft, a clutch shifter for engagement with said clutch, resilient means urging said clutch shifter to position said clutch to connect said manually operated means to drive said driven shaft, and a governor operably responsive to rotation of said power driven means to move said clutch shifter against the urging of said resilient means to position said clutch to connect said power driven mechanism to drive said driven shaft.

2. A device for transmitting a power driven or a manually applied force alternately and comprising, a driven shaft, a manually operated means including a drive shaft and adapted for selective driving connection with said driven shaft, a power driven mechanism adapted for selective driving connection with said driven shaft, a clutch which is alternately operable to connect either said power driven mechanism or said manually operated means with said driven shaft, a clutch shifter for engagement with said clutch, a friction member connecting said clutch shifter and said manually operated means and operable upon rotation of said drive shaft to move said clutch shifter to position said clutch to connect said manually operated means to drive said driven shaft, and a governor operably responsive to rotation of said power driven means to move said clutch shifter to position said clutch to connect said power driven mechanism to drive said driven shaft.

3. A device for transmitting a power driven or a manually applied force alternately and comprising, a driven shaft, a drive transmission means freely rotatable thereon, a manually operated means adapted for selective driving connection with said driven shaft, including a manually operable shaft whose axis is parallel to said driven shaft and which has a handle on one end thereof, a spur gear rotatably mounted on said manually operable shaft, an axle in co-axial alignment with said driven shaft and which has mounted thereon to rotate therewith a clutch jaw means and a spur pinion to mesh with said spur gear a power driven mechanism adapted for selective driving connection with said driven shaft, including a power driving shaft parallel to and spaced from said driven shaft and said manually operable shaft, a power source on the end of said power driving shaft adjacent said handle, and a transmission element establishing driving engagement between said driving shaft and said transmission means a clutch sleeve slidably and non-rotatably mounted on said driven shaft which is alternately operable to connect said power driven mechanism or said manually operated means with said driven shaft, said clutch sleeve having a lost motion clutch jaw on one end thereof to mesh with said clutch jaw means, and a clutch member on the other end thereof to engage said transmission means to rotate therewith, a clutch shifter rockably mounted on an axis transverse to the axes of said shifts for engagement with said clutch sleeve, resilient means urging said clutch sleeve shifter to position said clutch to connect said manually operated means to drive said driven shaft, and a solenoid member operable in coincidence with actuation of said power driven mechanism to move said clutch shifter against the urging of said resilient means to position said clutch sleeve to connect said power driven mechanism to drive said driven shaft.

4. A device for transmitting a power driven or a manually applied force alternately and comprising a frame, a driven shaft journalled in said frame, a manually operated means including a drive shaft journalled in said frame and adapted for selective driving connection with said driven shaft, a power driven mechanism adapted for selective driving connection with said driven shaft, a clutch splined to said driven shaft and slidable thereon to connect either said power driven mechanism or said manually operated means with said driven shaft, groove means in said clutch, a clutch shifter for engagement with said groove means a friction member on said drive shaft and connected to said clutch shifter and operable upon rotation of said drive shaft to move said clutch shifter to position said clutch to connect said manually operated means to drive said driven shaft, and a governor operably responsive to rotation of said power driven means to move said clutch shifter to position said clutch to connect said power driven mechanism to drive said driven shaft.

5. A device for transmitting a power driven or a manually applied force alternately and comprising, a frame, a driven shaft journalled therein, a manually operated means adapted for selective driving connection with said driven shaft, a power driven mechanism adapted for selective driving connection with said driven shaft, a clutch splined to said driven shaft and slidable thereon to connect either said power driven mechanism or said manually operated means with said driven shaft, groove means in said clutch, a clutch shifter journalled in said frame and adapted for engagement in said groove means, resilient means connecting said frame and said clutch shifter and urging said clutch shifter to position said clutch to connect said manually operated means to drive said driven shaft, and a governor operably responsive to rotation of said power driven means to move said clutch shifter against the urging of said resilient means to position said clutch to connect said power driven mechanism to drive said driven shaft.

6. A device for transmitting a power driven or a manually applied force alternately and comprising, a frame, a driven shaft journalled therein, a transmission means freely rotatable thereon, a manually operated means adapted for selective driving connection with said driven shaft, including a manually operable shaft whose axis is parallel to said driven shaft and which has a handle on one end thereof, a spur gear rotatably mounted on said manually operable shaft, an axle in co-axial alignment with said driven shaft and which has mounted thereon to rotate therewith a clutch jaw means and a spur pinion to mesh with said spur gear a power driven mechanism adapted for selective driving connection with said driven shaft, including a power driving shaft parallel to and spaced from said driven shaft and said manually operable shaft, a power source on the end of said power driving shaft adjacent said handle, and a transmission element establishing driving engagement between said driving shaft and said transmission means a clutch splined to said driven shaft and slidable thereon to connect said power driven mechanism or said manually operated means with said driven shaft, said clutch sleeve having a lost motion clutch jaw on one end thereof to mesh with said clutch jaw means, and a clutch member on the other end thereof to engage said transmission means to rotate therewith, groove means in said clutch sleeve, a clutch shifter having an axle journalled in said frame with axis transverse to the axes of said shafts and adapted for engagement with said groove means, resilient means connecting said clutch shifter to said frame and urging said clutch shifter to position said clutch sleeve to connect said manually operated means to drive said driven shaft, and a solenoid member mounted on said frame and operable in coincidence with actuation of said power driven mechanism to move said clutch shifter against the urging of said resilient means to position said clutch sleeve to connect said power driven mechanism to drive said driven shaft.

7. A drive source shifting device comprising, a housing including a first frame member and a second frame member spaced therefrom, a driven shaft journalled in said first frame member and having a portion extending toward said second frame member and being adapted for connection to an external mechanism outwardly of said first frame member, a power driving shaft spaced from and on an axis parallel to the axis of said driven shaft and journalled in said second frame member and having a portion extending toward said first frame member, a power source connected to said power driving shaft outwardly of said second frame member, a manually operable shaft journalled in said second frame member in parallelism with said driven shaft and having a handle thereon outwardly of said second frame member for manual manipulation, a spur gear on said manually operable shaft, a spur pinion of substantially smaller diameter than and in mesh with said spur gear, a first clutch jaw means fixed to said pinion, an axle journalled in said second frame member mounting said spur pinion and said first clutch jaw means for rotation co-axially of said driven shaft, a transmission element driven by said power driving shaft, a transmission driven member freely rotatable upon said driven shaft portion including a second clutch jaw means co-axially spaced from said first clutch jaw means, a clutch sleeve slidably and non-rotatably mounted on said driven shaft portion in the space between said first and second clutch jaw means and having clutch jaw means on both ends thereof, each of dimension to mesh with the clutch jaw means adjacent thereto and to permit substantial relative angular lost motion rotation before driving engagement is established with said adjacent clutch jaw means, a clutch shifter bell crank lever rockably mounted in said housing on an axis transverse to said shaft axes and engageable with said clutch sleeve to shift said clutch sleeve between a first position to effect driving engagement between said first clutch jaw means and the sleeve clutch jaw means adjacent thereto so that manual operation through said spur gear and said spur pinion may be transmitted to said first clutch jaw means, and a second position to effect driving engagement between said second clutch jaw means and the sleeve clutch jaw means adjacent thereto so that power driving operation through said transmission may be transmitted to said transmission means and said second clutch jaw means, constantly exerted force applying means contacting said bell crank lever to maintain said clutch sleeve shifted to said first position, and actuating means contacting said bell crank lever and operative coincidentally with the operation of said power source to overcome the force of said force applying means to shift said sleeve to, and maintain said sleeve in, said second position.

8. A drive source shifting device comprising, a housing including a first frame member and a second frame member spaced therefrom, a driven shaft journalled in said first frame member and having a portion extending toward said second frame member and being adapted for connection to an external mechanism outwardly of said first frame member, a power driving shaft spaced from and on an axis parallel to the axis of said driven shaft and journalled in said second frame member and having a portion extending toward said first frame member, an electric motor connected to said power driving shaft outwardly of said second frame member, a manually operable shaft journalled in said second frame member and having a handle thereon outwardly of said second frame member, a spur gear on said manually operable shaft, a spur pinion of substantially smaller pitch diameter than said spur gear, a first clutch jaw means, an axle journalled in said second frame member mounting said spur pinion and said first clutch jaw means for rotation therewith and to position said spur pinion to mesh with said spur gear, a transmission element driven by said power driving shaft, a transmission member freely rotatable upon said driven shaft portion including a second clutch jaw means, a clutch sleeve slidably and nonrotatably mounted on said driven shaft portion between said first and second clutch jaw means and having clutch jaw means on either end thereof each of dimension to mesh with the clutch jaw means adjacent thereto and to permit substantial relative angular lost motion rotation before driving engagement is established with said adjacent clutch jaw means, a clutch shifter bell crank lever rockably mounted in said housing on an axis transverse to said shaft axes and engageable with said clutch sleeve to shift said clutch sleeve between a first position to effect driving engagement between said first clutch jaw means and the sleeve clutch jaw means adjacent thereto so that manual operation through said spur gear and said spur pinion may be transmitted to said first clutch jaw means, and a second position to effect driving engagement between said second clutch jaw means and the sleeve clutch jaw means adjacent thereto so that power driving operation through said transmission element may be transmitted to said transmission means and said second clutch jaw means, a spring connected at one end to said housing and at the other end to said bell crank lever to resiliently urge said lever to move and maintain said clutch sleeve in said first position, a solenoid, a circuit for supplying energizing current to drive said motor and to energize said solenoid, means to transmit motion from said solenoid to said bell crank lever so that energization of the solenoid armature will urge said bell crank lever in direction to overcome the force of said spring and shift said clutch sleeve to said second position, and a circuit switch to complete said circuit to said motor and solenoid in coincidence, and to open said circuit for de-energizing said solenoid so that said spring urges said lever to restore said clutch sleeve and maintain it in said second position.

9. A drive source shifting device comprising in rotatably mounted and spaced apart axial parallelism, a power driving shaft and a driven shaft, a manually operable axle rotatably mounted in co-axial alignment with said driven shaft, an electric motor drivingly connected to said power driving shaft, a first clutch jaw mounted for rotation with said axle, a transmission element driven by said power driving shaft and including a second clutch jaw freely rotatable on said driven shaft, a clutch shifter sleeve splined on said driven shaft and having clutch jaw means to mesh with limited hammer blow clearance with said first and second clutch jaws, a clutch shifter bell crank lever rockably mounted on an axis transverse to the axes of said shafts to shift said clutch sleeve between a first position of engagement with said first clutch jaw means, and a second position of engagement with said second clutch jaw means, a spring connected to said bell crank lever to resiliently bias said clutch sleeve to said first position, a solenoid, a circuit for supplying energizing current to drive said motor and to energize said solenoid, means operatively connecting the solenoid to said lever so that upon energization said clutch shifter sleeve is shifted against the force of said spring to said second position, and a switch to complete said circuit so that said motor is driven and said solenoid is energized in coincidence, the opening of said switch de-energizing said solenoid for the return of said clutch shifter sleeve to said first position under influence of said biasing spring.

10. Control mechanism for alternate manual and power actuation including a power shaft, a manually operated shaft, and an output shaft all mounted on parallel axes, a pair of spaced clutch elements co-axially mounted with the output shaft, a shifter clutch keyed on the output shaft to engage said clutch elements, the drive clutch engagement between the shifter clutch and the manually operable clutch being a lost motion jaw type for hammer blow engagement, step-up gearing for transmitting manual effort to said manually operable shaft, yieldable biasing means operative to urge the shifter clutch into engagement with said jaw element, and current flow responsive means operable to overcome said biasing means and to shift the shifter clutch into engagement with the other clutch element.

11. In a valve control including a motor drive, a worm gear whose rotation effects opening and closing movement of the valve stem, a shaft carrying a worm coacting with the worm gear, and for effecting movement of the valve-stem, a train of positive power-transmitting elements between the motor-drive and the gear having as one of its elements a clutch including a driving element and a reciprocable driven element respectively rotatably and nonrotatably carried by the worm shaft, a hand motivatable mechanism including a shaft parallel to the worm-shaft carrying a hand crank and a gear, a toothed member slidably mounted on the worm-shaft for rotation therewith and for reciprocation with the reciprocable clutch element, spring means normally urging the slidable member and the reciprocable clutch element to a position with the slidable member in operative connection with the gear on the hand-crank shaft for hand-operation of the valve, and rockable yoke means, a shaft in said train, means mounted on said last-mentioned shaft adapted to be automatically responsive to actuation of the motor drive to operate said yoke means to effect longitudinal displacement of the slidable member and reciprocable clutch element from the gear on the hand-crank shaft to a clutching position with the driving element for motor drive of the valve.

12. In a valve control including a motor drive, a worm gear whose rotation effects opening and closing movement of the valve stem, a shaft carrying a worm coacting with the worm gear, and for effecting movement of the valve-stem, a train of positive power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-crank and a gear, a toothed member slidably mounted on the worm-shaft for rotation therewith and for reciprocation with the reciprocable clutch element, a friction element operative when said hand-crank is turned to urge the slidable member and the reciprocable clutch element to a position with the slidable member in operative connection with the gear on the hand-crank shaft for hand-operation of the valve, a clutch-shifting yoke rockably mounted on a pivot axis transversely of the axis of the worm-shaft and engageable with the reciprocable element of the clutch for effecting axial shifting of that element and the slidable member on the worm-shaft from a first position wherein the valve is hand-operated to a second position wherein the slidable member is disconnected from the gear of the hand-crank shaft and the reciprocable clutch element is engaged with the driving clutch element for motor-drive of the valve, a shaft in said train, and means mounted on said last-mentioned shaft adapted to be automatically responsive to actuation of the motor drive to rock said yoke to effect said second position engagement.

13. In a valve control including a motor drive, a worm gear whose rotation effects opening and closing movement of the valve stem, a shaft carrying a worm coacting with the worm gear, and for effecting movement of the valve-stem, a train of positive power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-crank and a gear, a toothed member slidably mounted on the worm-shaft for rotation therewith and for reciprocation with the reciprocable clutch element, spring means normally urging the slidable member and the reciprocable clutch element to a position with the slidable member in operative connection with the gear on the hand-crank shaft for hand-operation of the valve, a clutch-shifting yoke rockably mounted on a pivot axis transversely of the axis of the worm-shaft and engageable with the reciprocable element of the clutch for effecting axial shifting of that element and the slidable member on the worm-shaft from a first position wherein the valve is hand-operated to a second position wherein the slidable member is disconnected from the gear of the hand-crank shaft and the reciprocable clutch element is engaged with the driving clutch element for motor-drive of the valve, a shaft in said train, and automatic means mounted on said last-mentioned shaft for effecting rocking of the clutch-shifting yoke and operable upon actuation of the motor drive to disconnect the valve from hand-operation.

14. In a valve control including a motor drive, a worm gear whose rotation effects opening and closing movement of the valve stem, a shaft carrying a worm coacting with the worm gear, and for effecting movement of the valve-stem, a train of power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-crank and a gear, a toothed member slidably mounted on the worm-shaft for rotation therewith and for reciprocation with the reciprocable clutch element, means to urge the slidable member and the reciprocable clutch element to a position with the slidable member in operative connection with the gear on the hand-crank shaft for hand-operation of the valve, a clutch-shifting yoke rockably mounted on a pivot axis transversely of the axis of the worm-shaft and engageable with the reciprocable element of the clutch for effecting axial shifting of that element and the slidable member on the worm-shaft from a first position wherein the valve is hand-operated to a second position wherein the slidable member is disconnected from the gear of the hand-crank shaft and the reciprocable clutch element is engaged with the driving clutch element for motor-drive of the valve, and automatic means for effecting rocking of the clutch-shifting yoke and operable upon actuation of the motor drive to disconnect the valve from hand-operation, said automatic means including a flyball assembly mounted for rotation with the motor drive and having engagement with a portion of said yoke.

15. The mechanism according to claim 14 wherein said flyball assembly includes a mounting portion fixed for rotation with a drive shaft of the motor-drive, at least one flyball element pivotally carried on said mounting portion and having an arm pivotally movable therewith, a sleeve slidable on said drive shaft and engaged at one end by said arm whereby upon actuation of the motor drive, the flyball element pivots and its arm axially shifts said sleeve to effect pivoting of said yoke.

16. The mechanism of claim 11 wherein said spring means includes a spring positioned to oppose relative approach about the worm shaft between the driving clutch element and the reciprocable clutch element.

17. In a valve control including a motor drive, a worm gear whose rotation effects opening and closing movement of the valve stem, a shaft carrying a worm coacting with the worm gear, and for effecting movement of the valve-stem, a train of positive power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-crank and a gear, a toothed member slidably mounted on the worm-shaft for rotation therewith and for reciprocation with the reciprocable clutch element, spring means normally urging the slidable member and the reciprocable clutch element to a position with the slidable member in operative connection with the gear on the hand-crank shaft for hand-operation of the valve, rockable yoke means substantially balanced about a vertical plane through the axis thereof, and means automatically responsive to actuation of said motor drive to operate said yoke means to effect clutching and to interrupt the connection for hand-operation of the valve and effect operative connection between the motor drive and the valve.

18. In a valve control including a motor drive, a worm-gear whose rotation effects opening and closing movement of the valve stem, a shaft carrying a worm coacting with the worm-gear, and for effecting movement of the valve stem, a train of positive power transmitting elements between the motor-drive and the worm-gear having as one of its elements a clutch including a driving element and a reciprocable driven element respectively rotatably and non-rotatably carried by the worm shaft, a hand-operable mechanism including a shaft carrying a hand-crank and a gear, a toothed member slidably mounted on the worm-shaft for rotation therewith and for reciprocation with the reciprocable element of the clutch, means constantly exerting pressure normally urging the slidable member and the reciprocable element of the clutch to a position with the slidable member in operative connection with the gear on the hand-crank shaft for hand-operation of the valve, a clutch-shifting yoke rockably mounted on a pivot axis transversely of the axis of the worm-shaft and engageable with the reciprocable element of the clutch for effecting axial shifting of that element and the slidable member on the worm-shaft, and mechanical means automatically responsive to actuation of said motor drive to effect said last-mentioned axial shifting from a first position wherein the valve is hand-operated to a second position wherein the slidable member is disconnected from the gear of the hand crank shaft and the reciprocable clutch element is engaged with the driving clutch element for motor drive of the valve, said yoke including a U-shaped portion straddling the reciprocable element of the clutch and substantially coplanar with the pivot axis of the yoke.

19. The mechanism according to claim 18 wherein said yoke has a second U-shaped portion extending oppositely from the first U-shaped portion and substantially coplanar therewith thereby providing a yoke substantially balanced about a vertical plane through the pivot axis.

20. The mechanism according to claim 19 wherein said second U-shaped portion has a pair of substantially aligned inwardly extending pins terminating in juxtaposition to a drive shaft of the motor drive, and means carried by said drive shaft engageable with said pins for effecting pivoting of said yoke from said first position to said second position.

21. The mechanism according to claim 20 wherein said last recited means comprises a pair of flyball elements pivotally mounted for rotation with said drive shaft and outwardly pivoted upon rotation of said drive shaft, each of said flyball elements having an arm pivotally movable therewith, a sleeve slidable on said drive shaft and engageable with said pair of pins with said arms being engageable against said sleeve upon outward pivoting of the flyball elements to axially slide the sleeve to effect pivoting of said yoke between said two positions.

22. In a valve control including a motor drive, a worm gear whose rotation effects opening and closing movement of the valve stem, a shaft carrying a worm coacting with the worm gear, and for effecting movement of the valve-stem, a train of positive power-transmitting elements between the motor-drive and the gear having as one of its elements a clutch including a driving element and a reciprocable driven element respectively rotatably and nonrotatably carried by the worm shaft, a hand motivatable mechanism including a shaft parallel to the worm-shaft carrying a hand-crank and a gear, a toothed member slidably mounted on the worm-shaft for rotation therewith and for reciprocation with the reciprocable clutch element, means constantly exerting pressure normally urging the slidable member and the reciprocable clutch element to a position with the slidable member in operative connection with the gear on the hand-crank shaft for hand-operation of the valve, rockable yoke means operable to effect longitudinal displacement of the slidable member and reciprocable clutch element from the gear on the hand-crank shaft to a clutching position with the driving element for motor drive of the valve, said reciprocable clutch element and slidable member being unitary, and mechanical means automatically responsive upon actuation of the motor drive to move said yoke means to effect said last-mentioned longitudinal displacement.

23. In a valve control including a motor drive, a worm gear whose rotation effects opening and closing movement of the valve stem, a shaft carrying a worm coacting with the worm gear, and for effecting movement of the valve stem, a train of positive power transmitting elements between the motor drive and the gear having one clutch means among its elements, said clutch means including a driving element and driven element, a hand motivatable mechanism including a shaft spaced from the worm shaft carrying a hand crank and a gear, a cooperative gear coaxial with the worm shaft operatively connected to the gear on the hand crank shaft when said driven element is in operative connection with said hand motivatable mechanism, one of said clutch elements being reciprocably and nonrotatably carried by one of said shafts and the other of said clutch elements being rotatably carried by one of said shafts, means constantly exerting pressure normally retaining operative connection between the hand motivatable mechanism and the worm shaft and breaking the operative connection between the motor drive and worm shaft by normally urging the reciprocable clutch element to a position disconnected from said other of said clutch elements, and rockable yoke means, means automatically responsive to actuation of the motor drive to operate said yoke means to break the operative connection between the hand motivatable mechanism and the worm shaft and to perfect operative connection between the motor drive and worm shaft by effecting displacement of the reciprocable clutch element to a clutching position in opposition to the said means constantly exerting pressure.

24. In a valve control including a motor drive, a worm gear whose rotation effects opening and closing movement of the valve stem, a shaft carrying a worm coacting with the worm gear, and for effecting movement of the valve stem, a train of positive power transmitting elements between the motor drive and the gear having one clutch means among its elements, said clutch means including a driving element and driven element, said driven element being reciprocable, and said driving and driven elements being respectively rotatably and non-rotatably carried by the worm shaft, a hand motivatable mechanism including a shaft spaced from the worm shaft carrying a hand crank and a gear, a cooperative gear coaxial with the worm shaft operatively connected to the gear on the hand crank shaft when said driven element is in operative connection with said hand motivatable mechanism, friction spring means for making operative connection between the hand motivatable mechanism and the worm shaft and breaking the operative connection between the motor drive and worm shaft by moving the reciprocable clutch element to a position disconnected from said driving element, and rockable yoke means, means automatically responsive to actuation of the motor drive to operate said yoke means to break the operative connection between the hand motivatable mechanism and the worm shaft and to perfect operative connection between the motor drive and worm shaft by effecting displacement of the reciprocable clutch element to a clutching position in opposition to the friction means.

25. In a valve control including a motor drive, a worm gear whose rotation effects opening and closing movement of the valve stem, a shaft carrying a worm coacting with the worm gear, and for effecting movement of the valve stem, a train of power transmitting elements between the motor drive and the gear having as one of its elements a clutch including a driving element and driven element, the motor drive being in constant positive coupling relation to said train, a hand motivatable mechanism including a shaft spaced from the worm shaft carrying a hand crank and a gear, a cooperative gear coaxial with the worm shaft operatively connected to the gear on the hand crank shaft when said driven element is in operative connection with said hand motivatable mechanism, one of said clutch elements being reciprocably and nonrotatably carried by one of said shafts and the other of said clutch elements being rotatably carried by one of said shafts, spring means normally retaining operative connection between the hand motivatable mechanism and the worm shaft and breaking the operative connection between the motor drive and worm shaft by normally urging the reciprocable clutch element to a position disconnected from said other of said clutch elements, a clutch shifting yoke rockably mounted in a pivot axis transversely of the axis of the worm shaft and engageable with the reciprocable clutch element, and means automatically responsive to actuation of the motor drive to operate said yoke for effecting axial shifting of that element from a first position wherein the valve is hand-operated to a second position wherein the reciprocable clutch element is engaged with the driving clutch element for motor drive of the valve.

26. In a valve control including a motor drive, a worm gear whose rotation effects opening and closing movement of the valve stem, a shaft carrying a worm coacting with the worm gear, and for effecting movement of the valve stem, a train of power transmitting elements between the motor drive and the gear having as one of its elements a clutch including a driving element and driven element, the motor drive being in constant positive coupling relation to said train, a hand motivatable mechanism including a shaft spaced from the worm shaft carrying a hand crank and a gear, a cooperative gear coaxial with the worm shaft operatively connected to the gear on the hand crank shaft when said driven element is in operative connection with said hand motivatable mechanism, one of said clutch elements being reciprocably and nonrotatably carried by one of said shafts and the other of said clutch elements being rotatably carried by one of said shafts, spring means normally retaining operative connection between the hand motivatable mechanism and the worm shaft and breaking the operative connection between the motor drive and worm shaft by normally urging the reciprocable clutch element to a position disconnected from said other of said clutch elements, and rockable yoke means operable upon actuation of the motor drive to break the operative connection between the hand motivatable mechanism and the worm shaft and to perfect operative connection between the motor drive and worm shaft by effecting displacement of the reciprocable clutch element to a clutching position in opposition to the spring means, and automatic means for effecting rocking of the clutch-shifting yoke means and operable upon actuation of the motor drive to disconnect the valve from hand-operation.

27. In a valve control including a motor drive, a worm gear whose rotation effects opening and closing movement of the valve stem, a shaft carrying a worm coacting with the worm gear, and for effecting movement of the valve stem, a train of power transmitting elements between the motor drive and the gear having as one of its elements a clutch including a driving element and driven element, the motor drive being in constant positive coupling relation to said train, a hand motivatable mechanism including a shaft spaced from the worm shaft carrying a hand crank and a gear, a cooperative gear coaxial with the worm shaft operatively connected to the gear on the hand crank shaft when said driven element is in operative connection with said hand motivatable mechanism, one of said clutch elements being reciprocably and nonrotatably carried by one of said shafts and the other of said clutch elements being rotatably carried by one of said shafts, means for making operative connection between the hand motivatable mechanism and the worm shaft and breaking the operative connection between the motor drive and worm shaft by moving the reciprocable clutch element to a position disconnected from said other of said clutch elements, and rockable yoke means operable upon actuation of the motor drive to break the operative connection between the hand motivatable mechanism and the worm shaft and to perfect operative connection between the motor drive and worm shaft by effecting displacement of the reciprocable clutch element to a clutching position with said other of said clutch elements, and automatic means for effecting rocking of the clutch-shifting yoke means and operable upon actuation of the motor drive to disconnect the valve from hand-operation, said automatic means including a flyball assembly mounted for rotation with the motor drive and having engagement with a portion of said yoke means.

28. The mechanism according to claim 27 wherein said flyball assembly includes a mounting portion fixed for rotation with a drive shaft of the motor-drive, at least one flyball element pivotally carried on said mounting portion and having an arm pivotally movable therewith, a sleeve slidable on said drive shaft and engaged at one end by said arm whereby upon actuation of the motor drive, the flyball element pivots and its arm axially shifts said sleeve to effect pivoting of said yoke means.

References Cited in the file of this patent

UNITED STATES PATENTS

| | | |
|---|---|---|
| 2,391,418 | Hodgson et al. | Dec. 25, 1945 |
| 2,414,032 | Fawkes | Jan. 7, 1947 |
| 2,651,543 | Rossman | Dec. 16, 1952 |

FOREIGN PATENTS

| | | |
|---|---|---|
| 897,852 | France | June 12, 1944 |